United States Patent [19]
Brundage

[11] 3,848,900
[45] Nov. 19, 1974

[54] EXTERNAL ROTARY SEAL FOR A SWIVEL JOINT

[76] Inventor: Ben W. Brundage, 4390 Piedmont Ave., Oakland, Calif. 94611

[22] Filed: Aug. 17, 1973

[21] Appl. No.: 389,328

[52] U.S. Cl. ............................................. 285/98
[51] Int. Cl. ..................... F16j 17/00, F16j 33/16
[58] Field of Search ....... 285/45, 98, 273, 337, 281, 285/275, 276, 278, 280

[56] References Cited
UNITED STATES PATENTS

| | | | |
|---|---|---|---|
| 3,011,803 | 12/1961 | Buckner et al. | 289/98 X |
| 3,186,737 | 6/1965 | Brundage | 285/276 X |
| 3,512,540 | 5/1970 | Hughes | 285/98 X |
| 3,740,801 | 6/1973 | Sears et al. | 285/45 X |

Primary Examiner—Geo. V. Larkin
Attorney, Agent, or Firm—Robert H. Eckhoff

[57] ABSTRACT

An improved external rotary seal for a swivel joint is provided.

2 Claims, 3 Drawing Figures

PATENTED NOV 19 1974 3,848,900

EXTERNAL ROTARY SEAL FOR A SWIVEL JOINT

BACKGROUND OF THE INVENTION

In my prior U.S. Pat. No. 3,186,737, I have disclosed the details of an external rotary seal for a swivel joint, particularly as such a joint is utilized in a drainage system for a floating roof installed in a tank. Heretofore users of floating roof drain line swivel fittings have had to rely on a light lip type dust seal to keep external pressure from forcing the product in the tank into the bearing area. When the product in the tank enters into the bearing area, it causes loss of lubricant and premature wear. The life and non-leaking quality of a swivel fitting internal packing ring depends upon the alignement of the bearing races. If the bearings and races wear from corrosion caused by external seepage, then premature leakage will occur through the swivel fittings and the product will be lost down the drain line. This necessitates draining the tank and the expense of replacing all the swivel fittings in the roof drain line.

SUMMARY OF THE INVENTION

The seal of the present invention provides a positive external seal bridging the space between the body and the rotating element. In accordance with this invention, this area is sealed by a flat ring gasket of TEFLON rotating against a VITON O-ring in the body. The TEFLON gasket is held in position by a special molded ring of VITON or HYCAR. The gasket and molded ring are positioned by a steel back-up ring attached to the rotating element. By tightening the stainless steel ring around the molded ring, pressure is applied to the seal and leakage is stopped on the outside of the swivel fitting. This addition means that the product has to leak past the special external seal, dust seal and swivel fitting pressure packing ring before it can enter the drain line.

DESCRIPTION OF THE PREFERRED EMBODIMENT

Figure 2:
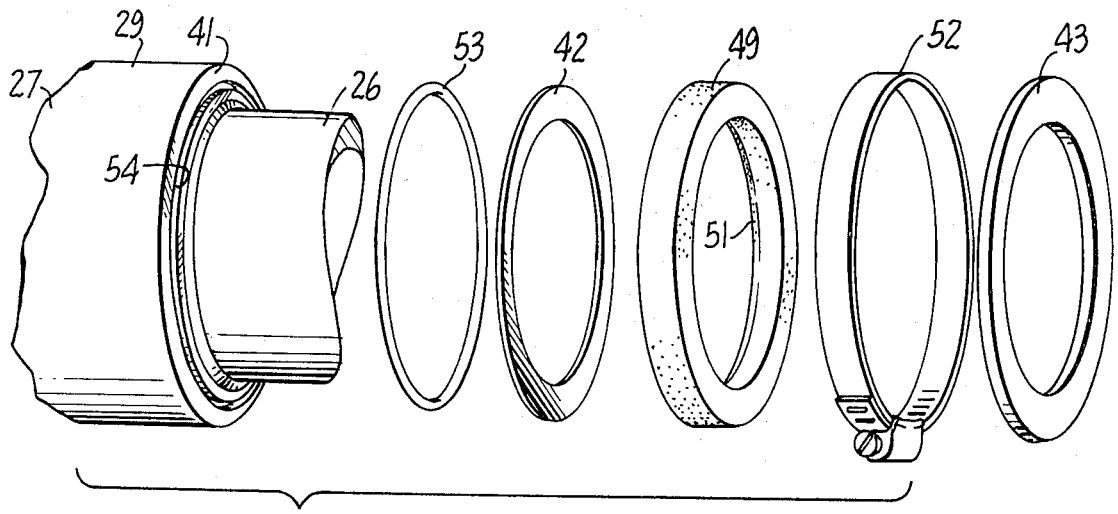
FIG. 2 is an exploded view in perspective showing the assembly of a swivel joint and the seal of FIG. 1.

As appears in FIG. 2, each swivel joint generally includes an ell section 26 (as shown in my aforementioned patent) and a straight section 27, the two being mounted one upon the other so that one can rotate with respect to the other. Thus, the cylindrical end 28 of ell section 26 is received within the tubular portion 29 of the section 27. Two sets of ball bearings 32 mount the end 28 for an easy rotational movement in the tubular portion 29. A seal structure generally indicated 33 is provided between end 34 on cylindrical end 28 and wall 35 on the tubular portion 29 to seal one side of the bearings. Another seal structure 36 is provided on the other side of the bearings between end 28 and tubular portion 29.

Figure 1:
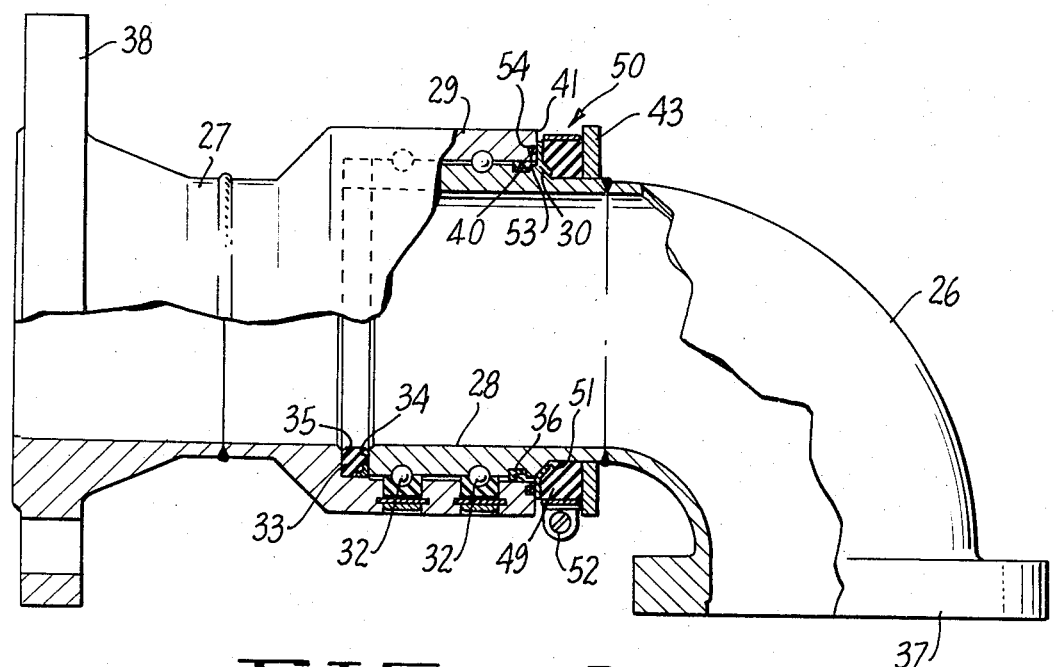
FIG. 1 is a side elevation partly in section through a swivel joint embodying the rotary seal of the present invention.

In the form of the swivel joint shown in FIG. 1, the ell 26 and the straight section 27 are each provided with flanged ends 37 and 38, and the structure is shown as generally assembled by welding.

The swivel joint structure can be otherwise provided. For example, instead of the flanged ends 37 and 38, one can provide threaded ends. In general, the structure so far described is that of a swivel joint which is currently on the market and which is sold as the "Chiksan" swivel joint. One can use any swivel joint, however, and the invention is not limited in application to the exact structure disclosed, for there are numerous swivel joints available.

Figure 3:
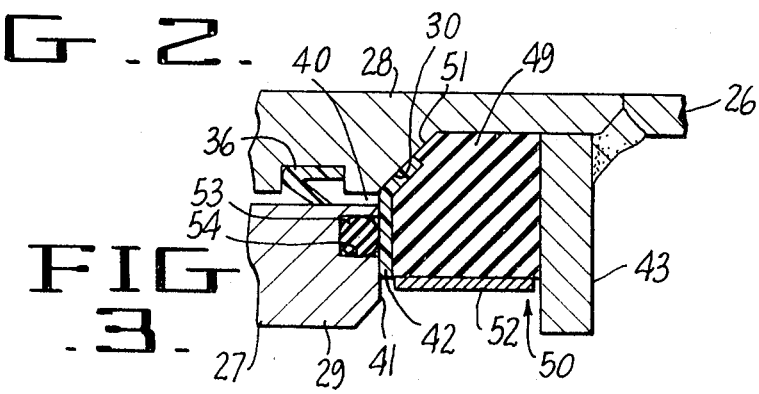
FIG. 3 is an enlarged sectional view showing the details of the external seal.

In accordance with the present invention, I provide an additional seal for the annular space 40 between end 41 of the tubular portion 29 and the exterior surface of the end 28. Thus, I provide an annular washer 42 of a suitable resilient material, such as TEFLON, fitting snugly along section 27 and over end 41. As appears in FIGS. 1 and 3, washer 42 fits over and extends on both sides of the annular opening between the end 28 and the receptacle 29. Preferably, the exterior of 26 is flared to form a shoulder 30 terminating in the same radial plane as end 41 so that these provide a smooth support for washer 42. To retain the flexible washer 42 in place under adequate sealing pressure, I provide a backup ring or stop 43 welded in place around section 26 adjacent end 28.

Mounted in groove 50 on one side face of backup ring 43 is a resilient member 49 having a curved or chamfered inner face 51. Member 49 is formed as a ring, as shown in FIG. 2, of a suitable material such as VITON or HYCAR. Upon the resilient members being compressed, the curved or chamfered face forces the annular washer 42 in snugly against the annular end 41 of the tubular portion 29 and against the side wall of section 28 to effect a seal. Compression of the ring 49 upon assembly is effected by the clamp 52.

A resilient sealing means in the form of an O-ring 53 is carried in groove 54 in the annular end 41 and bears against the flexible washer 42 on the side opposite to the ring member 49. The O-ring is made of a suitable resilient material such as VITON and together with resilient member 49 supports the TEFLON washer 42 and forms a compressive seal therewith when clamp 52 is tightened.

In use, when the two sections 26 and 27 rotate, resilient member 49 is carried with section 26 and O-ring 53 is carried with section 27. The TEFLON washer 42 increases the wear life of the resilient O-ring and is held effectively over the annular opening between the end 41 and side wall of section 26 so that the liquid in the tank cannot pass the O-ring and so enter the joint and attack the bearings.

I claim:
1. In a swivel joint:
    a. a first cylindrical member having a tubular portion terminating in an end;
    b. a second cylindrical member having an end rotatably mounted within said tubular portion of the first member;
    c. bearing means mounting and retaining said end of the said second member for rotation in the tubular portion of the first member with the end of the tubular portion of said first member fitting closely adjacent to but spaced from the second member to provide an annular space between the said first and second members;
    d. a resilient sealing means carried in the end of the first cylindrical member adjacent said annular space;

e. a shoulder on the said second member immediately adjacent said end of the said first cylindrical member and disposed substantially in the same radial plane therewith whereby to provide a substantially continuous surface including the said end of the said first cylindrical member and the said shoulder;

f. a washer lying against said sealing means in the end of the said first cylindrical member and against the shoulder of the said second member and extending across the annular space therebetween;

g. a resilient ring member fitted in a groove about said second member and engaged with the said washer;

h. a stop secured to the said second cylindrical member on the side of said resilient ring member opposite from said washer and engaged with the said resilient ring member whereby to prevent the resilient ring member from sliding away from the said washer; and i. a means for compressing said ring member to force the ring into engagement with said washer.

2. The structure of claim 1 wherein said compressing means comprises a clamp about said resilient ring to force the ring into engagement with said washer.

* * * * *